(12) United States Patent
Gharib

(10) Patent No.: US 9,816,563 B2
(45) Date of Patent: Nov. 14, 2017

(54) DRIVESHAFT RETENTION ASSEMBLY

(71) Applicant: Halliburton Energy Services, Inc., Houston, TX (US)

(72) Inventor: Hossam Mohamed Gharib, Edmonton (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 37 days.

(21) Appl. No.: 14/898,668

(22) PCT Filed: Mar. 11, 2015

(86) PCT No.: PCT/US2015/019805
§ 371 (c)(1),
(2) Date: Dec. 15, 2015

(87) PCT Pub. No.: WO2016/144338
PCT Pub. Date: Sep. 15, 2016

(65) Prior Publication Data
US 2017/0089399 A1    Mar. 30, 2017

(51) Int. Cl.
*F16D 1/08* (2006.01)
*F16D 1/112* (2006.01)
*E21B 17/046* (2006.01)

(52) U.S. Cl.
CPC .......... *F16D 1/0876* (2013.01); *E21B 17/046* (2013.01); *F16D 1/112* (2013.01)

(58) Field of Classification Search
CPC ...... F16D 1/0876; F16D 1/112; E21B 17/046; E21B 4/003; E21B 4/02; F16B 21/02;
(Continued)

(56) References Cited

U.S. PATENT DOCUMENTS 3,637,238 A * 1/1972 Grosch ................. E21B 17/046
                                                        285/330
4,522,541 A * 6/1985 Bidwell .................... F16B 5/10
                                                        24/DIG. 53
(Continued)

FOREIGN PATENT DOCUMENTS

EP    2189097 A2 *  5/2010  ............. A47L 11/08
WO    9805476      2/1998
(Continued)

OTHER PUBLICATIONS

International Patent Application No. PCT/US2015/019805, "International Search Report and Written Opinion" dated Oct. 20, 2015, 10 pages.

*Primary Examiner* — Jonathan Masinick
(74) *Attorney, Agent, or Firm* — Kilpatrick Townsend & Stockton LLP

(57) ABSTRACT

A retention apparatus can be used for a driveshaft transmission assembly. The retention apparatus may include a catch mechanism and a resilient member. The retention apparatus may be mounted to a radial bearing assembly of a driveshaft transmission assembly. The catch mechanism of the retention apparatus may be sized to prevent the loss of certain driveshaft transmission assembly components downhole in the event of a failure of the driveshaft transmission due to dynamic loads produced during operation in a drilling system.

20 Claims, 6 Drawing Sheets

(58) Field of Classification Search
CPC ............... F16B 21/04; Y10T 403/7005; Y10T 403/7007; Y10T 403/7015; Y10T 403/7022
See application file for complete search history.

(56) References Cited

U.S. PATENT DOCUMENTS

| | | | |
|---|---|---|---|
| 5,327,975 A | 7/1994 | Land et al. | |
| 6,035,953 A * | 3/2000 | Rear | E21B 7/208 175/171 |
| 6,070,678 A | 6/2000 | Pascale | |
| 6,145,602 A | 11/2000 | Kutinsky | |
| 6,827,162 B2 | 12/2004 | Fisher | |
| 7,063,175 B1 | 6/2006 | Kerstetter | |
| 7,267,185 B2 | 9/2007 | Underwood et al. | |
| 7,308,956 B2 | 12/2007 | Wenzel et al. | |
| 7,428,938 B2 | 9/2008 | Marshall | |
| 7,445,061 B1 | 11/2008 | Falgout, Sr. et al. | |
| 7,699,119 B1 * | 4/2010 | Lunde | E21B 17/046 175/18 |
| 8,025,110 B2 | 9/2011 | Falgout, Jr. et al. | |
| 8,869,917 B2 | 10/2014 | LeBlanc et al. | |
| 2005/0072602 A1 | 4/2005 | Pascale et al. | |
| 2007/0000696 A1 | 1/2007 | Laflin | |
| 2008/0029304 A1 | 2/2008 | LeBlanc et al. | |
| 2010/0314172 A1 | 12/2010 | Underwood et al. | |
| 2011/0274513 A1 * | 11/2011 | Chao | F16B 21/02 411/344 |
| 2012/0227257 A1 * | 9/2012 | Kalavitz | F16B 21/04 29/825 |
| 2014/0105707 A1 * | 4/2014 | Tseng | F16B 21/04 411/508 |
| 2015/0248975 A1 * | 9/2015 | Bonfanti | H01H 9/285 200/50.28 |
| 2015/0343540 A1 * | 12/2015 | Hoop | B28D 1/041 408/204 |

FOREIGN PATENT DOCUMENTS

| | | | | |
|---|---|---|---|---|
| WO | 2012177339 | 12/2012 | | |
| WO | 2014126889 | 8/2014 | | |
| WO | WO 2014126889 A2 * | 8/2014 | ............... | E21B 3/00 |

* cited by examiner

DRIVESHAFT RETENTION ASSEMBLY

CROSS-REFERENCE TO RELATED APPLICATIONS

This is a U.S. national phase under 35 U.S.C. 371 of International Patent Application No. PCT/US2015/019805, titled "DRIVESHAFT RETENTION ASSEMBLY" and filed Mar. 11, 2015, which is incorporated herein by reference in its entirety.

TECHNICAL FIELD

The present disclosure relates generally to an assembly for a driveshaft transmission and, more particularly (although not necessarily exclusively), to a driveshaft retention assembly to prevent the loss of driveshaft transmission assembly components.

BACKGROUND

Mud motors utilize fluid energy converted to mechanical energy to provide shaft rotation to a drill string or drill bit. Because the mud motor is a highly loaded section of a drilling tool, it is prone to critical damage during motor transmission failure. Failure of the motor transmission may result in critical damage to the transmission assembly, including the separation of components from the transmission assembly. Where such separation occurs, these components may be lost downhole. The lost components dropped downhole can prevent further progression in drilling and can cause significant delays. The loss of components downhole may even result in a drilling project being abandoned.

A procedure known as "fishing" is sometimes used to retrieve the lost components, but this procedure is costly and time-consuming, and may be ineffective.

DETAILED DESCRIPTION

Certain aspects and examples of the present disclosure relate to a downhole driveshaft transmission assembly having a retention apparatus. The retention apparatus may include a catch mechanism and a resilient member. The retention apparatus may be coupled to a radial bearing assembly of a driveshaft transmission assembly. The catch mechanism may include ridges on the inner surface corresponding to protrusions on the radial bearing assembly. The ridges may be sized to be received by channels formed by the protrusions on the radial bearing assembly. The ridges may be spaced to form grooves in the catch mechanism that are sized to allow the protrusions on the radial bearing assembly to be received by the grooves. The ridges may also be spaced to correspond to the spacing of the protrusions so the ridges and protrusions may couple the catch mechanism to the radial bearing assembly by the resilient member. The resilient member may apply a compression force onto the catch mechanism in an uphole direction to couple the catch mechanism to the radial bearing assembly by securing the ridges to the protrusions. Should a break occur in the downhole driveshaft transmission assembly, the catch mechanism may prevent the loss of the driveshaft and other driveshaft transmission assembly components downhole.

The structure of the retention apparatus can allow the catch mechanism to be coupled to the radial bearing assembly without threading. Installing and maintaining the driveshaft transmission assembly may be more cost-effective and efficient as the use of threading may require heightened inspections and testing that may be both costly and time-consuming. Instead of threading, the retention apparatus can allow the catch mechanism to be coupled to the radial bearing assembly through interconnecting components, for example using a J-slot coupling, and a compression force.

The terms "inner," "outer," "internal," and "between," as used in the present disclosure, may refer to a radial orientation toward or away from the center of the driveshaft transmission assembly. The terms "uphole," "downhole," and "proximate," as used in the present disclosure, may refer to an axial orientation toward or away from the surface.

Figure 1:
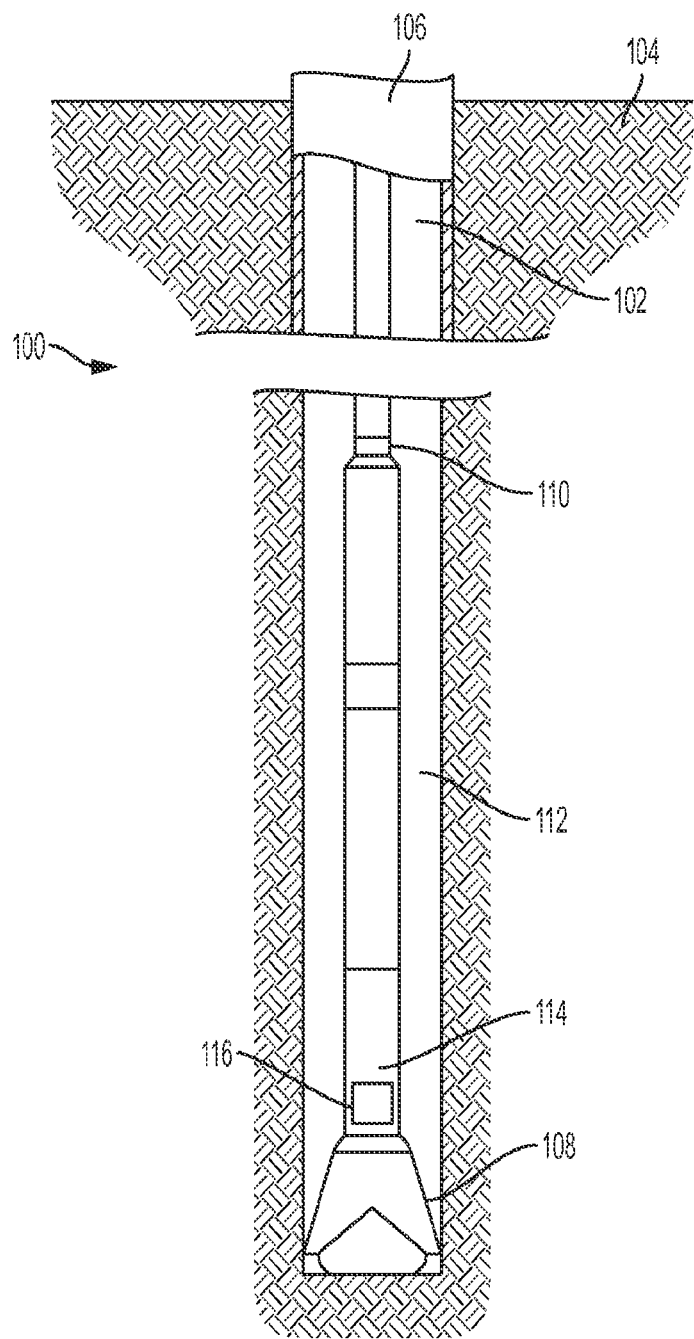
FIG. 1 is a cross-sectional schematic diagram depicting a drilling system that includes a driveshaft transmission assembly with a retention apparatus in a lower end of a driveshaft transmission assembly according to one aspect of the present disclosure.

Various aspects of the present disclosure may be implemented in various drilling systems. FIG. 1 illustrates an example of such a drilling system 100 that includes a drill string 102. The drill string 102 of a drilling rig (not shown) may include segmented pipes that may extend below the surface 104 in a borehole, such as a wellbore 106. The drill string 102 may transmit drilling fluid (or mud) and the torque necessary to operate a drill bit 108. Also, the weight of the drill string 102 may provide an axial force on the drill bit 108.

The drill string 102 may include a drill pipe 110 and a bottom hole assembly 112. The bottom hole assembly 112 may be include various components, such as a downhole motor assembly 114 and the drill bit 108.

Though placement of the assemblies disclosed herein may vary without departing from the scope of the present subject matter, the assemblies of the present disclosure may be included in the lower end of the downhole motor assembly 114 and near the drill bit 108. For example, the driveshaft transmission assembly 116 depicted in FIG. 1 represents a placement according to one example. Placement of the assemblies as close to the drill bit 108 as possible may reduce the moment arm load induced from directional drilling. Reducing the moment arm load may result in longevity of the motor assembly and bearings of the drilling installation, and may reduce the likelihood of failure of the motor.

During operation of the drilling system, dynamic loads may be placed on a drill motor by the action of the drill bit 108 and by vibrations of the drill string 102. In certain instances, the dynamic loads may cause the drill motor to fail and components of the driveshaft transmission assembly 116 to separate. The driveshaft transmission assembly 116 can include a retention apparatus to prevent the loss of components downhole in the event of a separation.

Figure 2:
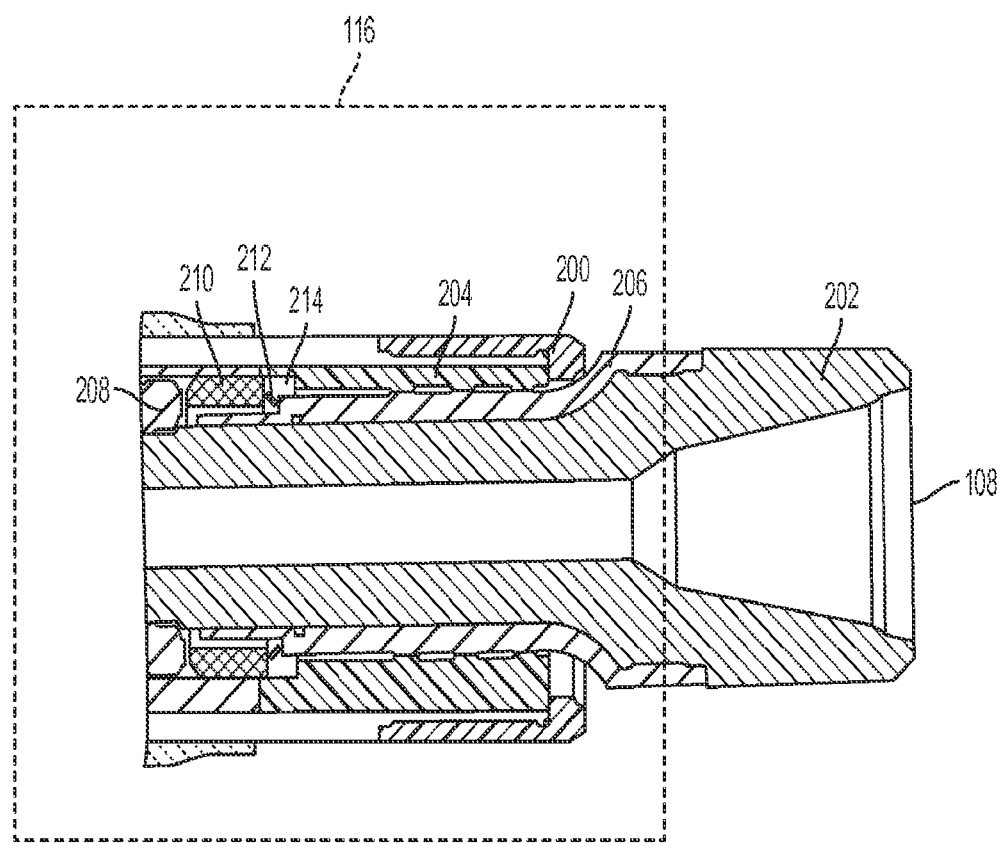
FIG. 2 is a cross-sectional view of a driveshaft transmission assembly according to one aspect of the present disclosure.

FIG. 2 shows an example of the driveshaft transmission assembly 116 that includes a retention apparatus according to one aspect of the present disclosure. The driveshaft transmission assembly 116 also includes a bearing housing 200 and certain bearings of a driveshaft 202. The catch mechanism can be separate and independent of the bearing housing 200 and the driveshaft 202. One or more radial bearing assemblies may be included internal to the bearing housing 200. For example, FIG. 2 includes a stationary radial bearing 204 and a rotating radial bearing 206. A thrust bearing assembly 208 may also be included internal to the bearing housing 200. In some aspects, the rotating radial bearing 206 may be radially positioned between the driveshaft 202 and the stationary radial bearing 204 and may be coupled to the driveshaft 202. The stationary radial bearing 204 may be radially positioned between the rotating radial bearing 206 and the bearing housing 200. The stationary radial bearing 204 may be coupled to the bearing housing 200 and may be configured to support the driveshaft in the radial direction. The thrust bearing assembly 208 may be radially positioned between the rotating radial bearing 206 and the bearing housing 200. Although only these radial and thrust bearing assemblies are shown in FIG. 2, alternative or additional bearing assemblies may be included in various configurations in the driveshaft transmission assembly 116 without departing from the scope of the present disclosure.

The retention apparatus in FIG. 2 includes a catch mechanism 210 and a resilient member 212. The catch mechanism 210 and resilient member 212 may be received by the rotating radial bearing 206 such that the catch mechanism 210 and resilient member 212 surround a portion of the rotating radial bearing 206. The catch mechanism 210 and resilient member 212 are radially positioned between the rotating radial bearing 206 and the bearing housing 200 and are independent of the bearing housing 200. The catch mechanism 210 and resilient member 212 are axially positioned between the thrust bearing assembly 208 (on the uphole side) and the stationary radial bearing 204 (on the downhole side). The catch mechanism 210 is axially positioned directly uphole of the resilient member 212.

The catch mechanism 210 may have an outer diameter greater than the outer diameter of the rotating radial bearing 206. As such, at least a portion of the catch mechanism 210 may extend beyond the outer diameter of the rotating radial bearing 206 when the catch mechanism 210 is coupled to the rotating radial bearing 206. The resilient member 212 may be axially positioned between the catch mechanism 210 on a portion of the rotating radial bearing 206. The rotating radial bearing 206 may have an enlarged portion having a greater outer diameter than the outer diameter of the portion of the rotating radial bearing 206 where the resilient member 212 is positioned. In some aspects, the catch mechanism 210 and resilient member 212 may surround an indented portion of the rotating radial bearing 206.

Following a failure of the drill motor, the retention apparatus of the driveshaft transmission assembly 116 may prevent certain components of the driveshaft transmission assembly 116, including the driveshaft 202 and drill bit 108, from falling, or being lost, downhole in the event of separation. For example, when a separation occurs, the outer surface of the catch mechanism 210 may create an interference with the contact shoulder 214 of the stationary radial bearing 204 to prevent the retention apparatus from moving in a downhole direction beyond the contact shoulder 214. Because the catch mechanism 210 may be coupled to the rotating radial bearing 206, the interference of the catch mechanism 210 with the contact shoulder 214 of the stationary radial bearing 204 may prevent the rotating radial bearing 206 and any components directly or indirectly coupled thereto (e.g., driveshaft 202, drill bit 108) from falling downhole.

Figure 3:
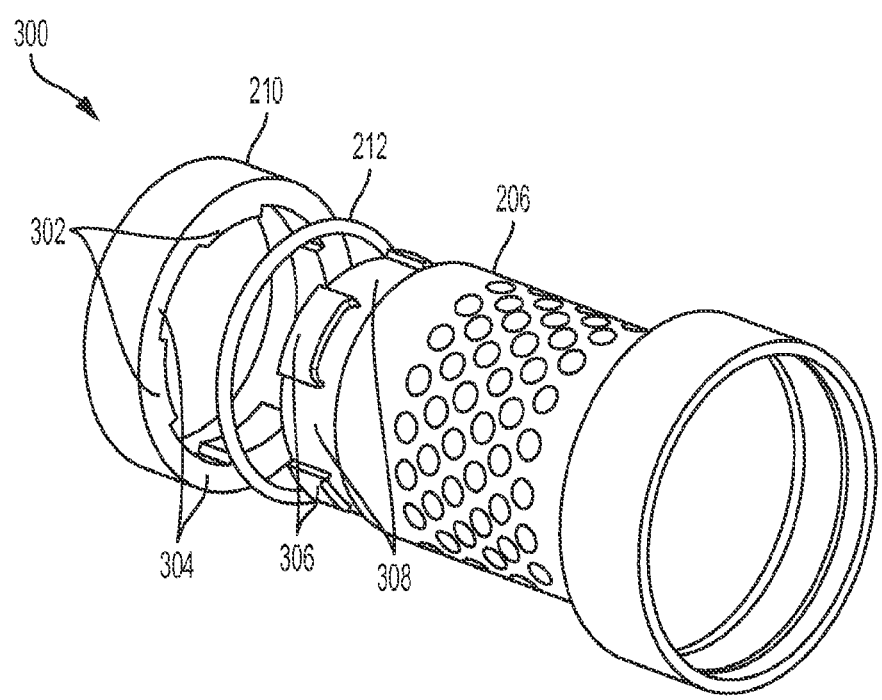
FIG. 3 is a disassembled perspective view of a retention apparatus according to one aspect of the present disclosure.

FIGS. 3 through 6 illustrate an example of a retention apparatus 300 that may be used to prevent the loss of driveshaft transmission assembly components downhole. FIG. 3 shows a disassembled view of a retention apparatus 300 that may be received for positioning on a radial bearing assembly (e.g., rotating radial bearing 206). The retention apparatus 300 may be received separately from or together with the radial bearing assembly (or other components of the driveshaft transmission assembly. The retention apparatus 300 may include the catch mechanism 210 and the resilient member 212. The catch mechanism 210 may be a cylindrical component with an inner diameter sized to slide onto the rotating radial bearing 206. The catch mechanism 210 may be rigid and capable of withstanding a load when interfering with the contact shoulder 214 of the stationary radial bearing 204. In some aspects, the catch mechanism 210 may be made of the same material as other components of the driveshaft transmission assembly 116 (e.g., steel). The resilient member 212 may be a flexible, ring-shaped component that is sized to slide onto the rotating radial bearing 206. An example of the resilient member 212 is a spring, such as a Belleville spring, a compression spring, or a wave spring. When the retention apparatus 300 is fully assembled, the resilient member 212 may provide a compression force on the catch mechanism 210 in the uphole direction.

The catch mechanism 210 may include ridges 302 positioned on the inner surface of the catch mechanism. The catch mechanism 210 in FIG. 3 includes four ridges 302 that are evenly spaced. However, the number of ridges 302 is not limited to four, and may include two, three, or five or more ridges 302. The spacing of the ridges 302 may also vary. The spacing of the ridges 302 may form grooves on the catch mechanism 210. The rotating radial bearing 206 includes protrusions 306 on the outer surface of the rotating radial bearing 206. The number of protrusions 306 may be equal to the number of ridges 302 on the catch mechanism 210 such that each ridge 302 may have a corresponding protrusion 306. The protrusions 306 are evenly spaced in FIG. 3, but the spacing of the protrusions 306 on the rotating radial bearing 206 may vary. The grooves 304 on the catch mechanism 210 may be sized to allow the protrusions 306 to be received by the grooves 304 when the catch mechanism 210 is installed onto the rotating radial bearing 206. Similar to the grooves 304 on the catch mechanism 210, the spacing of the protrusions 306 may create channels 308. The channels 308 may be sized to allow the ridges 302 on the rotating radial bearing 206 to be received by the channels 308 when the catch mechanism 210 is installed onto the rotating radial bearing 206. The number of channels 308 may be equal to the number of ridges 302 such each ridge 302 may have a corresponding channel 308.

Figure 4:
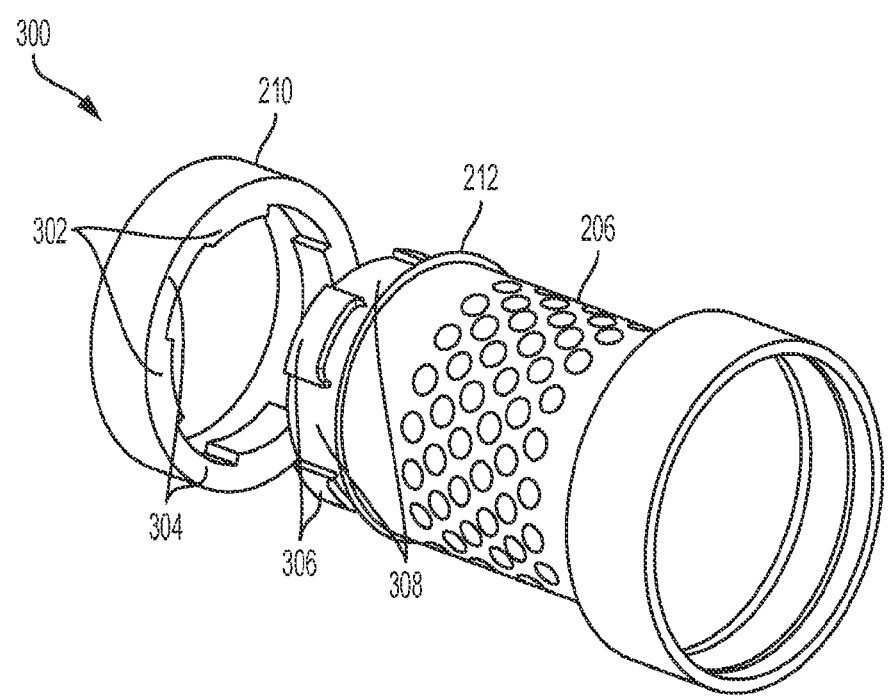
FIG. 4 is a partially assembled perspective view of the retention apparatus of FIG. 3 according to one aspect of the present disclosure.
Figure 5:
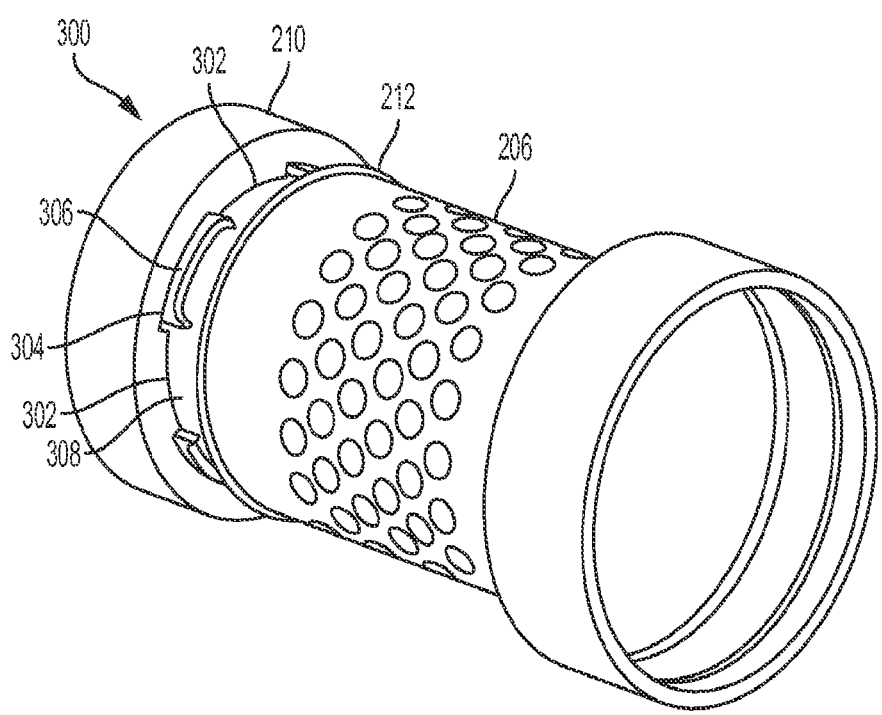
FIG. 5 is a partially assembled perspective view of the retention apparatus of FIG. 3 according to one aspect of the present disclosure.

FIGS. 4 and 5 show the retention apparatus 300 at different stages of assembly. The resilient member 212 is shown in FIG. 4 as having been slidably received by the rotating radial bearing 206. In this position, the resilient member 212 may contact the uphole edge of an enlarged portion of the rotating radial bearing 206. In FIG. 5, the catch mechanism 210 is shown as being slidably received by the rotating radial bearing 206. The ridges 302 of the catch mechanism 210 are positioned in the channels 308 created by the protrusions 306 on the rotating radial bearing 206 and the protrusions 306 are positioned in the grooves 304 created by the ridges on the catch mechanism 210. When the ridges 302 be received by channels 308, the catch mechanism 210 may contact the resilient member 212 as shown in FIG. 6.

Figure 6:
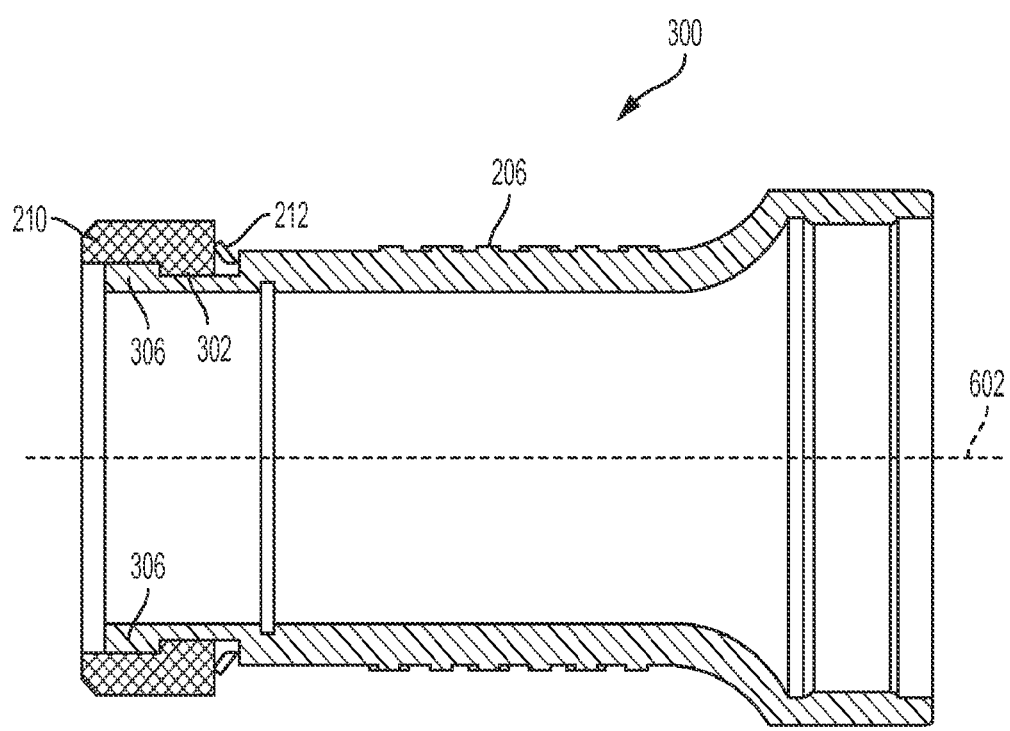
FIG. 6 is a cross-sectional view of the assembled retention apparatus of FIG. 3 according to one aspect of the present disclosure.

FIG. 6 shows a cross-sectional view of the retention apparatus 300 assembled on a rotating radial bearing 206. The catch mechanism 210 of the retention apparatus 300 may be coupled to the rotating radial bearing 206 using J-slot coupling. Specifically, the catch mechanism 210 may be slidably received by the rotating radial bearing 206 and may make contact with the resilient member 212. When the ridges 302 of the catch mechanism 210 have been received by the channels 308 of the rotating radial bearing 206, the catch mechanism 210 may apply a compression force onto the resilient member 212 in a downhole direction such that the compression force compresses the resilient member 212.

The catch mechanism 210 or the rotating radial bearing 206 may be rotated until the ridges 302 are positioned proximate to the protrusions 306. For, example, the catch mechanism 210 or the rotating radial bearing 206 may be rotated by a number of degrees in a clockwise or counter-clockwise direction until the ridges are axially aligned with the protrusions 306. The axis of rotation to axially align the ridges 302 and the protrusions 306 may be equal to a longitudinal axis 602 of the rotating radial bearing 206. When the ridges 302 of the catch mechanism 210 are positioned proximate to the protrusions 306 of the rotating radial bearing 206, the resilient member 212 may apply an uphole compression force such that each of the ridges 302 of the catch mechanism 210 contacts a downhole edge of a corresponding protrusion 306 on the rotating radial bearing 206. In some aspects, the downhole edge of the protrusions 306 may be shaped to receive the ridges 302. The shape of the downhole edge may further prevent decoupling of the catch mechanism 210 from the rotating radial bearing 206, as shown in FIGS. 3 through 5.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. An assembly comprising:
a radial bearing assembly;
a catch mechanism having an inner diameter sized to be slidably received onto the radial bearing assembly and an outer diameter sized to extend radially beyond an outer diameter of the radial bearing assembly, the catch mechanism including ridges that are positionable proximate to corresponding protrusions on the radial bearing assembly; and
a resilient, ring-shaped band slidably received onto the radial bearing assembly to apply a compression force on the catch mechanism for coupling the catch mechanism to the radial bearing assembly, the resilient, ring-shaped band having an inner diameter defined by a continuous surface.

2. The assembly of claim 1, wherein the outer diameter of the catch mechanism is sized to prevent a loss of driveshaft transmission assembly components downhole subsequent to a separation of the driveshaft transmission assembly components.

3. The assembly of claim 1, wherein the resilient, ring-shaped band is a Belleville spring having a resiliency to apply the compression force on the catch mechanism such that the ridges are mounted to the corresponding protrusions having downhole edges shaped to mountably receive one of the ridges.

4. The assembly of claim 1, wherein the ridges are sized to be mountably received by the corresponding protrusions having downhole edges shaped to prevent the catch mechanism from rotating.

5. The assembly of claim 1, wherein the ridges are positionable to be received by corresponding channels on the radial bearing assembly.

6. The assembly of claim 1, wherein the ridges are positionable to form grooves on the catch mechanism, the grooves being sized to receive the corresponding protrusions on the radial bearing assembly.

7. The assembly of claim 1, wherein the ridges are positionable proximate to the corresponding protrusions to mount to the corresponding protrusions.

8. The assembly of claim 1, wherein the resilient, ring-shaped band is positionable to form a J-slot coupling of the ridges on the catch mechanism to the corresponding protrusions on the radial bearing assembly by applying the compression force on the catch mechanism in an uphole direction.

9. A driveshaft transmission assembly, comprising:
a radial bearing assembly having protrusions; and
a catch mechanism coupled to the radial bearing assembly and having an outer diameter sized to extend radially beyond an outer diameter of the radial bearing assembly, the catch mechanism including ridges that are coupled to the protrusions on the radial bearing assembly by a resilient band for applying a compression force on the catch mechanism; and
the resilient band positioned between the protrusions and a body of the radial bearing assembly, the resilient band being ring-shaped and having an inner diameter defined by a continuous surface.

10. The driveshaft transmission assembly of claim 9, wherein the outer diameter of the catch mechanism is further sized to prevent a loss of driveshaft transmission assembly components downhole after a separation of the driveshaft transmission assembly components.

11. The driveshaft transmission assembly of claim 9, further comprising the resilient band coupled to the radial bearing assembly and positioned to form a J-slot coupling of the ridges of the catch mechanism to the protrusions of the radial bearing assembly.

12. The driveshaft transmission assembly of claim 9, wherein the resilient band is a Belleville spring for applying the compression force on the catch mechanism in an uphole direction.

13. The driveshaft transmission assembly of claim 9, wherein the radial bearing assembly is a rotating radial bearing coupled to a driveshaft, the rotating radial bearing being positioned between the driveshaft and a stationary radial bearing, the stationary radial bearing having a contact shoulder for interfering with at least a portion of the catch mechanism after a separation of driveshaft transmission assembly components.

14. The driveshaft transmission assembly of claim 9, wherein the catch mechanism is independent of and internal to a bearing housing and is positioned downhole of a thrust bearing assembly.

15. The driveshaft transmission assembly of claim 9, wherein at least one protrusion of the protrusions on the radial bearing assembly includes a downhole edge shaped to receive at least one ridge of the ridges on the catch mechanism and to prevent decoupling of the catch mechanism from the radial bearing assembly during operation of the driveshaft transmission assembly in a borehole.

16. A method of assembling a retention apparatus, the method comprising:
   sliding a resilient member onto a radial bearing assembly having a longitudinal axis, the resilient member being ring-shaped band and having an inner diameter defined by a continuous surface;
   sliding a catch mechanism onto the radial bearing assembly to contact the resilient member;
   aligning protrusions on the radial bearing assembly and ridges on the catch mechanism; and
   releasing the catch mechanism to allow the resilient member to apply a compression force on the catch mechanism to couple the catch mechanism to the radial bearing assembly.

17. The method of claim 16, wherein the sliding the resilient member onto the radial bearing assembly includes sliding a Belleville spring onto a first portion of the radial bearing assembly having a first outer diameter until the spring contacts a second portion of the radial bearing assembly having a second outer diameter greater than the first outer diameter.

18. The method of claim 16, wherein the sliding the catch mechanism on to the radial bearing assembly includes:
   sliding the catch mechanism onto the radial bearing assembly such that the ridges on the catch mechanism is received by channels on the radial bearing assembly formed by the protrusions and such that the protrusions on the radial bearing assembly is received by grooves on the catch mechanism formed by the ridges; and
   applying a second compression force from the catch mechanism onto the resilient member in a downhole direction until the resilient member is compressed.

19. The method of claim 16, wherein the aligning the protrusions on the radial bearing assembly and the ridges on the catch mechanism includes rotating the radial bearing assembly or the catch mechanism until the protrusions are axially adjacent to the ridges.

20. The method of claim 16, wherein the releasing the catch mechanism includes removing a second compression force applied from the catch mechanism in a downhole direction such that the resilient member applies the compression force onto the catch mechanism in an uphole direction.

\* \* \* \* \*